(12) United States Patent
Wang et al.

(10) Patent No.: US 7,351,484 B2
(45) Date of Patent: Apr. 1, 2008

(54) HIGH FIELD CONTRAST MAGNETIC STAMPERS/IMPRINTERS FOR CONTACT PATTERNING OF MAGNETIC MEDIA

(75) Inventors: Li-Ping Wang, Fremont, CA (US); David Kuo, Palo Alto, CA (US); Jing Gui, Fremont, CA (US); Koichi Wago, Sunnyvale, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/358,100

(22) Filed: Feb. 22, 2006

(65) Prior Publication Data
US 2006/0196625 A1    Sep. 7, 2006

Related U.S. Application Data

(62) Division of application No. 10/429,799, filed on May 6, 2003, now Pat. No. 7,028,743.

(60) Provisional application No. 60/392,786, filed on Jun. 28, 2002.

(51) Int. Cl.
*G11B 5/66* (2006.01)
(52) U.S. Cl. ............ 428/827; 428/829; 428/848.5
(58) Field of Classification Search ............ 428/826, 428/827, 829, 848.5
See application file for complete search history.

(56) References Cited

U.S. PATENT DOCUMENTS

| | | | | |
|---|---|---|---|---|
| 4,698,273 A * | 10/1987 | Komuro et al. | ............ | 428/635 |
| 4,904,543 A * | 2/1990 | Sakakima et al. | ......... | 428/610 |
| 5,038,242 A * | 8/1991 | Fukushima et al. | ........ | 360/120 |
| 5,547,774 A * | 8/1996 | Gimzewski et al. | ........ | 428/826 |
| 5,552,236 A * | 9/1996 | Ohtake et al. | ............ | 428/826 |
| 5,699,848 A * | 12/1997 | Lee et al. | ............ | 164/46 |
| 6,238,846 B1 * | 5/2001 | Tacken | ............ | 430/320 |
| 6,387,476 B1 * | 5/2002 | Iwasaki et al. | ............ | 428/212 |
| 6,403,205 B1 * | 6/2002 | Shiratori | ............ | 428/212 |
| 6,455,174 B1 * | 9/2002 | Takao et al. | ............ | 428/632 |
| 6,761,618 B1 * | 7/2004 | Leigh et al. | ............ | 451/11 |
| 6,828,897 B1 * | 12/2004 | Nepela | ............ | 338/32 R |
| 7,028,743 B1 * | 4/2006 | Wang et al. | ............ | 164/46 |
| 7,036,209 B1 * | 5/2006 | Wago et al. | ............ | 29/603.2 |
| 7,177,117 B1 * | 2/2007 | Jiang et al. | ............ | 360/126 |

FOREIGN PATENT DOCUMENTS

EP    915456 A1 *    5/1999

OTHER PUBLICATIONS

NDT definition of permeability.*

* cited by examiner

*Primary Examiner*—Holly Rickman
*Assistant Examiner*—Gary D. Harris
(74) *Attorney, Agent, or Firm*—McDermott Will & Emery LLP

(57) ABSTRACT

A high field contrast magnetic stamper/imprinter for use in patterning of magnetic and magneto-optical (MO) recording media by contact printing, comprises:

(a) a layer of a magnetic material having a high saturation magnetization $B_{sat} \geq \sim 1.2$ and high permeability $\mu \geq \sim 5$, including a first, topographically patterned surface and a second surface opposite the first surface, the first, topographically patterned surface comprising a patterned plurality of spaced-apart recesses with a plurality of non-recessed areas therebetween, the topographical pattern corresponding to a magnetic pattern to be formed in a magnetic or MO recording medium; and (b) a layer of Ni on the second surface. A corrosion-resistant protective overcoat layer may be present on the topographically patterned surface. A method for manufacturing the stamper/imprinter is also disclosed.

8 Claims, 5 Drawing Sheets

HIGH FIELD CONTRAST MAGNETIC STAMPERS/IMPRINTERS FOR CONTACT PATTERNING OF MAGNETIC MEDIA

RELATED APPLICATIONS

This application is a divisional of application Ser. No. 10/429,799, filed May 6, 2003 now U.S. Pat. No. 7,028,743, which claims priority of U.S. Provisional Application No. 60/392,786, filed Jun. 28, 2002, the contents of which are hereby incorporated by reference.

FIELD OF THE INVENTION

The present invention relates to improved, high field contrast magnetic stampers/imprinters utilized for forming patterns in a layer or body of magnetic material, and to methods for manufacturing same. The invention enjoys particular utility in the formation of servo patterns in the surfaces of magnetic layers of magnetic and magneto-optical (MO) data/information storage and retrieval media, e.g., hard disks.

BACKGROUND OF THE INVENTION

Magnetic and magneto-optical (MO) recording media are widely used in various applications, e.g., in hard disk form, particularly in the computer industry, for storage and retrieval of large amounts of data/information. Typically such media require pattern formation in the major surface(s) thereof for facilitating operation, e.g., servo pattern formation for enabling positioning of the read/write transducer head over a particular data band or region.

Magnetic and magneto-optical (MO) recording media are conventionally fabricated in thin film form; the former are generally classified as "longitudinal" or "perpendicular", depending upon the orientation (i.e., parallel or perpendicular) of the magnetic domains of the grains of the magnetic material constituting the active magnetic recording layer, relative to the surface of the layer.

In operation of magnetic media, the magnetic layer is locally magnetized by a write transducer or write head to record and store data/information. The write transducer creates a highly concentrated magnetic field which alternates direction based on the bits of information being stored. When the local magnetic field applied by the write transducer is greater than the coercivity of the recording medium layer, then the grains of the polycrystalline magnetic layer at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical contact start/stop (CSS) method employed during use of disk-shaped recording media, such as the above-described thin-film magnetic recording media, involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Adverting to FIG. 1, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 1 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Commonly assigned, co-pending U.S. patent application Ser. No. 10/082,178, filed Feb. 26, 2002, the entire disclosure of which is incorporated herein by reference, discloses a method and apparatus for reliably, rapidly, and cost-effectively forming very sharply defined magnetic transition patterns in a magnetic medium containing a longitudinal or perpendicular type magnetic recording layer without requiring expensive, complicated servo writing equipment/techniques incurring long processing intervals.

Specifically, the invention disclosed in U.S. patent application Ser. No. 10/082,178 is based upon recognition that a stamper/imprinter comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a contact "stamper/imprinter" for contact "imprinting" of a magnetic transition pattern, e.g., a servo pattern, in the surface of a magnetic recording layer of a magnetic medium ("workpiece"), whether of longitudinal or perpendicular type. A key feature of this invention is the use of a stamper/imprinter having an imprinting surface including a topographical pattern, i.e., comprised of projections and depressions corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to the invention, the magnetic domains of the magnetic recording layer of the workpiece are first unidirectionally aligned (i.e., "erased" or "initialized"), as by application of a first external, unidirectional magnetic field $H_{initial}$ of first direction and high strength greater than the saturation field of the magnetic recording layer, typically $\geq 2,000$ and up to about 20,000 Oe. The imprinting surface of the stamper/imprinter is then brought into intimate (i.e., touching) contact with the surface of the magnetic recording layer. With the assistance of a second externally applied magnetic field of second, opposite direction and lower but appropriate strength $H_{re-align}$, determined by $B_{sat}/\mu$ of the stamper material (typically $\geq 100$ Oe, e.g., from about 2,000 to about 4,500 Oe), the alignment of the magnetic domains at the areas of contact between the projections of the imprinting surface of the stamper/imprinter (in the case of perpendicular recording media, as schematically illustrated in FIG. 2) or at the areas facing the depressions of the imprinting surface of the stamper/imprinter (in the case of longitudinal recording media, as schematically illustrated in FIG. 3) and the magnetic recording layer of the workpiece is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the workpiece to be patterned which essentially mimics the topographical pattern of projections and depressions of the imprinting surface. According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

Stampers/imprinters for use in a typical application, e.g., servo pattern formation in the recording layer of a disk-shaped, thin film, longitudinal or perpendicular magnetic recording medium comprise an imprinting surface having topographical features consisting of larger area data zones separated by smaller areas with well-defined patterns of projections and depressions corresponding to conventionally configured servo sectors, as for example, disclosed in commonly assigned U.S. Pat. No. 5,991,104, the entire disclosure of which is incorporated herein by reference. For example, a suitable topography for forming the servo sectors may comprise a plurality of projections (alt. depressions) having a height (alt. depth) in the range from about 100 to about 500 nm, a width in the range from about 50 to about 500 nm, and a spacing in the range from about 50 to about 500 nm.

According to conventional methodology, stampers/imprinters suitable for use in performing the foregoing patterning processes are manufactured by a sequence of steps as schematically illustrated in cross-sectional view in FIG. 4, which steps include providing a "master" comprised of a substantially rigid substrate with a patterned layer of a resist material thereon, the pattern comprising a plurality of projections and depressions corresponding (in positive or negative image form, as necessary) to the desired pattern to be formed in the surface of the stamper/imprinter. Stampers/imprinters are made from the master by initially forming a thin, conformal layer of an electrically conductive, magnetic material (e.g., Ni) over the patterned resist layer and then electroforming a substantially thicker ("blanket") magnetic layer (of the aforementioned magnetic metals and/or alloys) on the thin layer of electrically conductive material, which electroformed blanket layer replicates the surface topography of the resist layer. Upon completion of the electroforming process, the stamper/imprinter is separated from the master, which is then re-used for making additional stampers/imprinters.

Existing Ni-based magnetic stampers/imprinters are disadvantageously limited in their ability to provide high field contrasts between contacting and non-contacting areas of a given topographical pattern design, primarily due to the relatively low $B_{sat}$ value of Ni of about 0.6 Tesla. However, Ni-based stampers/imprinters are durable and provide good mechanical performance.

Accordingly, there exists a need for improved magnetic stampers/imprinters for use in contact printing of magnetic patterns, and manufacturing methodology therefor, which stampers/imprinters reconcile the above apparent competing characteristics of Ni-based stampers/imprinters (i.e., limited high field contrast vs. good durability/mechanical performance) and utilize magnetic materials with $B_{sat}$ values greater than that of Ni (i.e., ~0.6 Tesla) for providing higher field contrast than possible with Ni, while maintaining the exemplary durability and mechanical performance characteristics of Ni-based stampers/imprinters. In addition, there exists a need for magnetic stampers/imprinters with improved corrosion resistance, particularly of the imprinting surfaces thereof.

The present invention, therefore, addresses and solves the aforementioned problems and difficulties associated with the use of conventional Ni-based magnetic stampers/imprinters utilized for contact printing of magnetic patterns in magnetic and MO recording media, while maintaining full compatibility with all other aspects of their manufacture and use.

DISCLOSURE OF THE INVENTION

An advantage of the present invention is a method of manufacturing an improved stamper/imprinter for use in patterning of magnetic and magneto-optical (MO) recording media by contact printing.

Another advantage of the present invention is a method of manufacturing an improved, high field contrast stamper/imprinter for use in servo patterning of magnetic and magneto-optical (MO) recording media by contact printing.

Yet another advantage of the present invention is an improved magnetic stamper/imprinter for use in patterning of magnetic and magneto-optical (MO) recording media by contact printing.

Still another advantage of the present invention is an improved, high field contrast magnetic stamper/imprinter for use in servo patterning of magnetic and magneto-optical (MO) recording media by contact printing.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a stamper/imprinter for use in patterning of magnetic and magneto-optical (MO) recording media by contact printing, comprising sequential steps of:

(a) providing a "master" comprising a body of material having a topographically patterned surface, the topographically patterned surface comprising a patterned plurality of spaced-apart recesses with a plurality of non-recessed areas therebetween, the topographical pattern corresponding to a magnetic pattern to be formed in a magnetic or MO recording medium;

(b) forming a blanket layer of a magnetic material having a high saturation magnetization $B_{sat} \geq \sim 1.2$ Tesla and high permeability $\mu \geq \sim 5$ on the topographically patterned surface, the blanket layer overfilling each of the plurality of recesses and including an overburden portion extending over each of the non-recessed areas, the blanket layer having an exposed surface opposite the topographically patterned surface;

(c) forming a layer of Ni on the exposed surface of the blanket layer; and (d) separating the thus-formed structure from the topographically patterned surface of the master to form a magnetic stamper/imprinter comprised of the blanket layer with a topographically patterned surface corresponding to the topographically patterned surface of the master and a Ni layer overlying the surface of the blanket layer opposite the topographically patterned surface thereof.

According to embodiments of the present invention, step (b) comprises forming the blanket layer in a thickness greater than about 1 μm; and step (c) comprises forming the layer of Ni in a thickness greater than that of the blanket layer and sufficient for providing said stamper/imprinter with mechanical rigidity and durability consistent with the requirements of the contact printing process.

Embodiments of the present invention include those wherein step (b) comprises forming the blanket layer from a high $B_{sat}$ material selected from the group consisting of NiFe, CoNiFe, CoSiFe, CoFe, CoFeB, and CoFeV; and wherein step (b) comprises sequential steps of:

($b_1$) forming a thin layer of the high $B_{sat} \geq \sim 1.2$ Tesla and high permeability $\mu \geq \sim 5$ material on the topographically patterned surface of the master; and ($b_2$) forming the blanket layer of the high $B_{sat} \geq \sim 1.2$ Tesla and high permeability $\mu \geq \sim 5$ material on the thin layer of the high $B_{sat} \geq \sim 1.2$ Tesla and high permeability $\mu \geq \sim 5$ material.

According to embodiments of the present invention, step ($b_1$) comprises forming the thin layer by means of a thin film deposition process selected from the group consisting of electroless plating, physical vapor deposition (PVD), and chemical vapor deposition (CVD); and step ($b_2$) comprises forming the blanket layer by means of an electrochemical process.

Preferred embodiments of the present invention are those wherein step ($b_1$) comprises forming the thin layer by sputtering; step ($b_2$) comprises forming the blanket layer by electroplating or electroforming; and step (c) comprises forming the layer of Ni by electroplating, or wherein: step (b) comprises forming the entire blanket layer by means of a deposition process selected from the group consisting of electroless plating, physical vapor deposition (PVD), and chemical vapor deposition (CVD); and step (c) comprises forming the layer of Ni by electroplating.

Further embodiments of the present invention include the additional step of:

(e) forming a thin protective overcoat layer of a corrosion-resistant material on said topographically patterned surface of said blanket layer.

Additional preferred embodiments of the present invention are those wherein step (e) comprises forming the thin protective overcoat layer of at least one corrosion-resistant material selected from the group consisting of carbon materials and oxide materials; the thin protective overcoat layer of a corrosion-resistant material being formed in a thickness less than about 100 Å by a technique selected from non-directional sputtering, oblique angle ion beam deposition (IBD), filtered cathodic arc deposition (FACD), and atomic layer deposition (ALD) while rotating the stamper/imprinter during the forming of the thin protective overcoat layer.

Further preferred embodiments of the invention are those wherein step (a) comprises providing a master wherein the topographically patterned surface corresponds to a servo pattern to be formed in a magnetic or MO recording medium.

Another aspect of the present invention is a high field contrast magnetic stamper/imprinter for use in patterning of magnetic and magneto-optical (MO) recording media by contact printing, comprising:

(a) a layer of a magnetic material having a high saturation magnetization $B_{sat} \geq \sim 1.2$ Tesla and high permeability $\mu \geq \sim 5$, the layer including a first, topographically patterned surface and a second surface opposite the first surface, the first, topographically patterned surface comprising a patterned plurality of spaced-apart recesses with a plurality of non-recessed areas therebetween, the topographical pattern corresponding to a magnetic pattern to be formed in a magnetic or MO recording medium; and (b) a layer of Ni on the second surface.

According to embodiments of the present invention, layer (a) of a magnetic material having a high saturation magnetization $B_{sat} \geq \sim 1.2$ Tesla and high permeability $\mu \geq \sim 5$ comprises a high $B_{sat}$ material selected from the group consisting of NiFe, CoNiFe, CoSiFe, CoFe, CoFeB, and CoFeV and has a thickness greater than about 1 μm; and Ni layer (b) has a thickness greater than that of layer (a) and sufficient for providing the stamper/imprinter with mechanical rigidity and durability consistent with the requirements of the contact printing process.

Further embodiments of high field contrast magnetic stampers/imprinters according to the present invention additionally comprise:

(c) a thin protective overcoat layer of a corrosion-resistant material on the topographically patterned surface of layer (a); wherein the protective overcoat layer (c) comprises at least one material selected from the group consisting of carbon materials and oxide materials and is less than about 100 Å thick.

Preferred embodiments of the present invention are those wherein the topographically patterned surface of layer (a) corresponds to a servo pattern to be formed in a magnetic or MO recording medium.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

The present invention addresses and solves disadvantages and drawbacks attendant upon the use of conventional Ni-based magnetic stampers/imprinters for performing contact patterning of magnetic and magneto-optical recording, e.g., servo patterning. Specifically, the present invention reconciles the above-described apparent competing characteristics of Ni-based stampers/imprinters (i.e., limited high field contrast vs. good durability/mechanical performance) and provides for improved magnetic stampers/imprinters which utilize magnetic materials with $B_{sat}$ values greater than that of Ni (i.e., >~0.6 Tesla) for providing higher field contrast than possible with Ni, while maintaining the exemplary mechanical performance characteristics of Ni-based stampers/imprinters. In addition, the present invention affords magnetic stampers/imprinters with improved corrosion resistance, particularly of the imprinting surfaces thereof.

Briefly stated, the present invention is based upon the discovery by the inventors that improved magnetic stampers/imprinters for contact printing of magnetic patterns can be fabricated according to the invention which combine the advantageous features of high field contrast provided by a topographically patterned imprinting surface composed of a layer of a magnetic material having a high saturation magnetization $B_{sat} \geq \sim 1.2$ Tesla and high permeability $\mu \geq \sim 5$ and the high durability/good mechanical performance provided by a Ni backing layer, as well as including a protective overcoat layer for minimizing corrosion/degradation of the imprinting surface.

Figure 1:
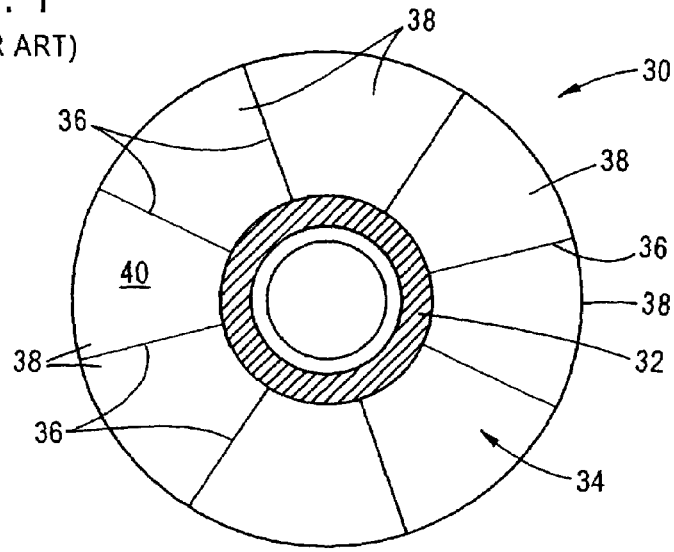
FIG. 1 illustrates in simplified, schematic plan view, a magnetic recording disk designating the data, servo pattern, and CSS zones thereof.
Figure 2:
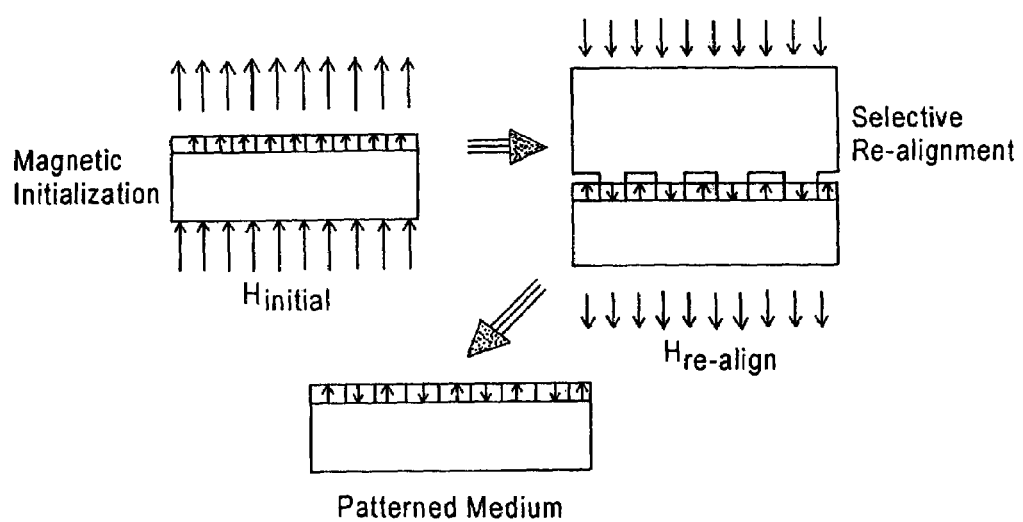
FIG. 2 illustrates, in schematic, simplified cross-sectional view, a sequence of process steps for contact printing a magnetic transition pattern in the surface of a perpendicular magnetic recording layer, utilizing a stamper/imprinter formed of a high saturation magnetization ($B_{sat}$), high permeability ($\mu$) magnetic material having an imprinting surface with a surface topography corresponding to the desired magnetic transition pattern.
Figure 3:
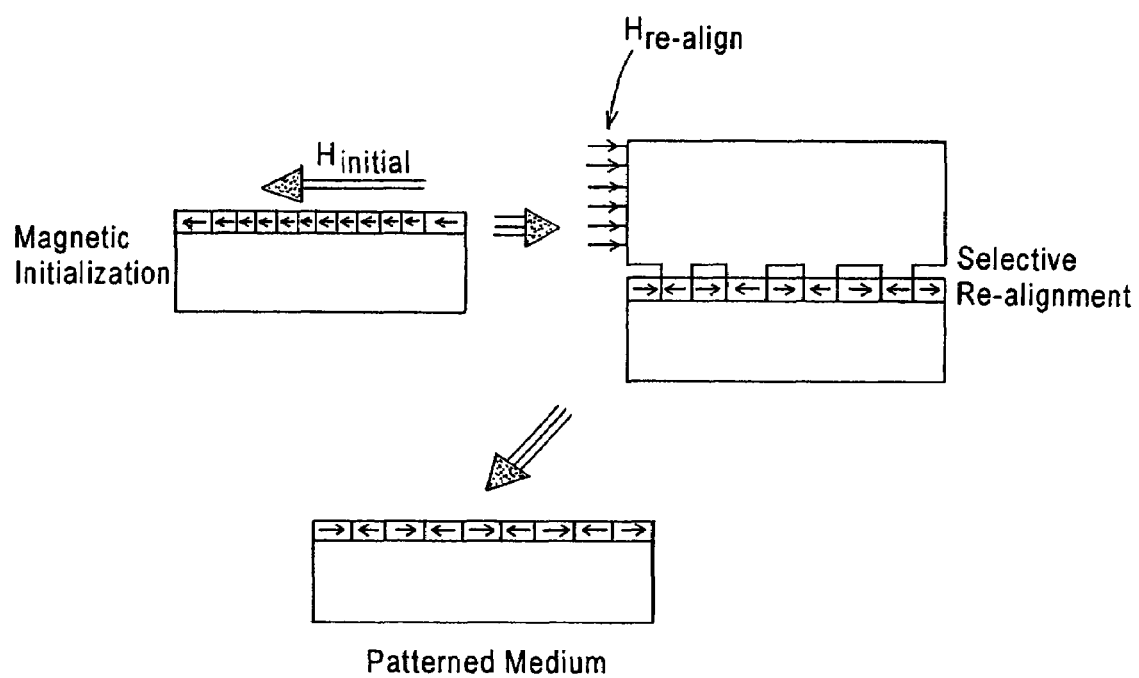
FIG. 3 illustrates, in schematic, simplified cross-sectional view, a similar sequence of process steps for contact printing a magnetic transition pattern in the surface of a longitudinal magnetic recording layer.
Figure 4:
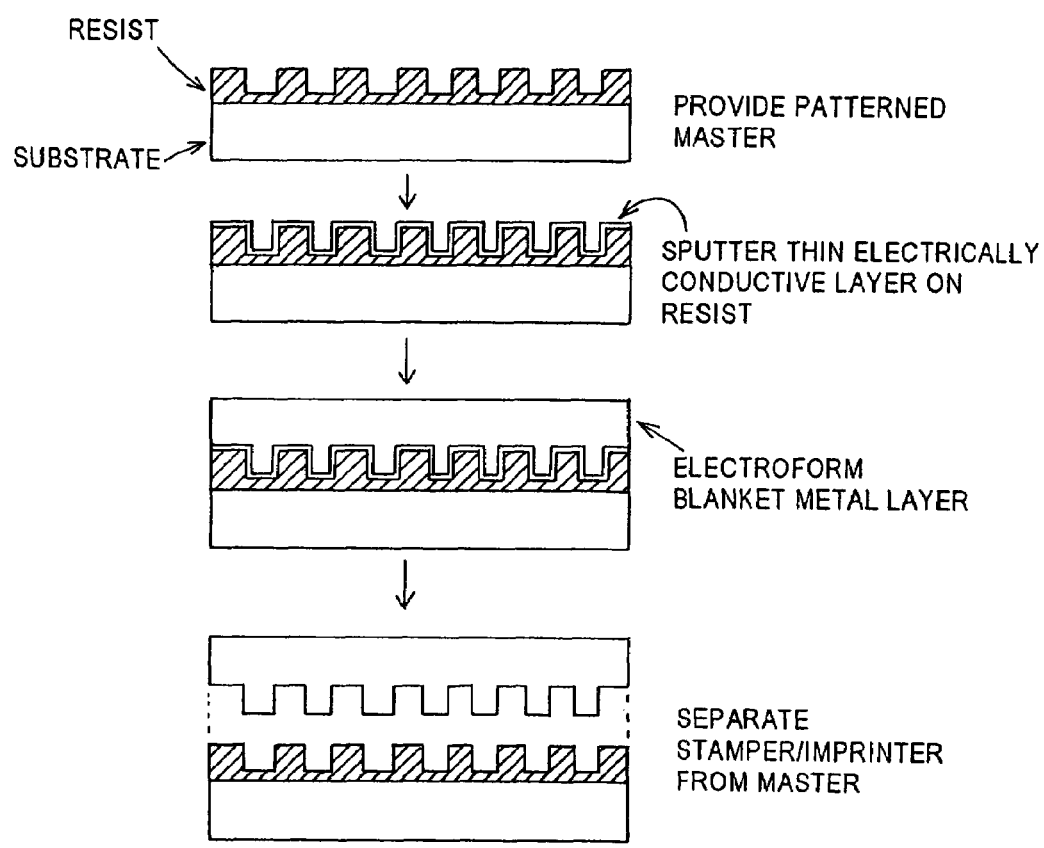
FIG. 4 schematically illustrates, in simplified cross-sectional view, a sequence of steps for forming a magnetic stamper/imprinter for recording media patterning, according to the conventional art.
Figure 5:
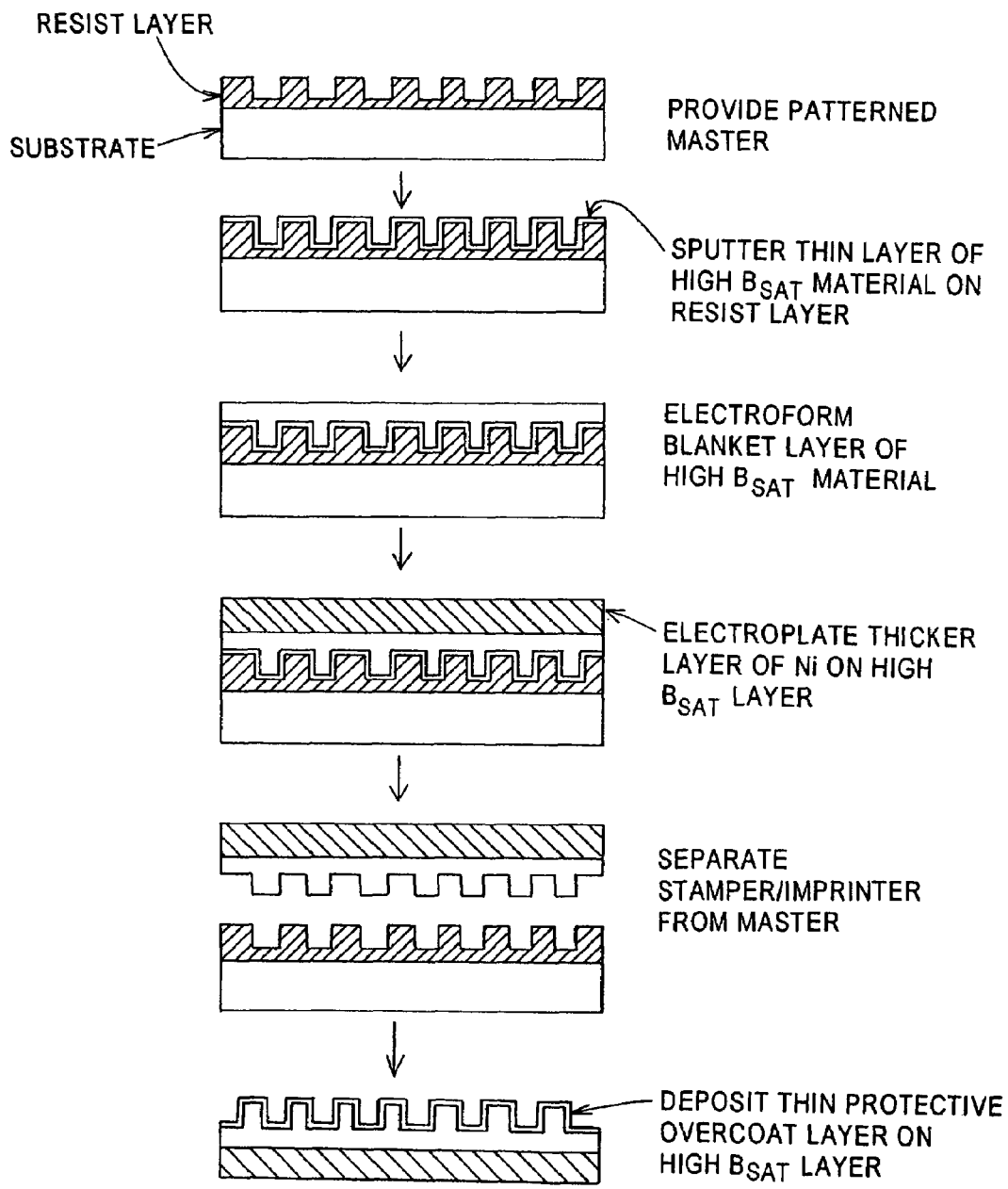
FIG. 5 schematically illustrates, in simplified cross-sectional view, a sequence of steps for forming a high field contrast magnetic stamper/imprinter for recording media patterning, according to an embodiment of the present invention.
Figure 6:
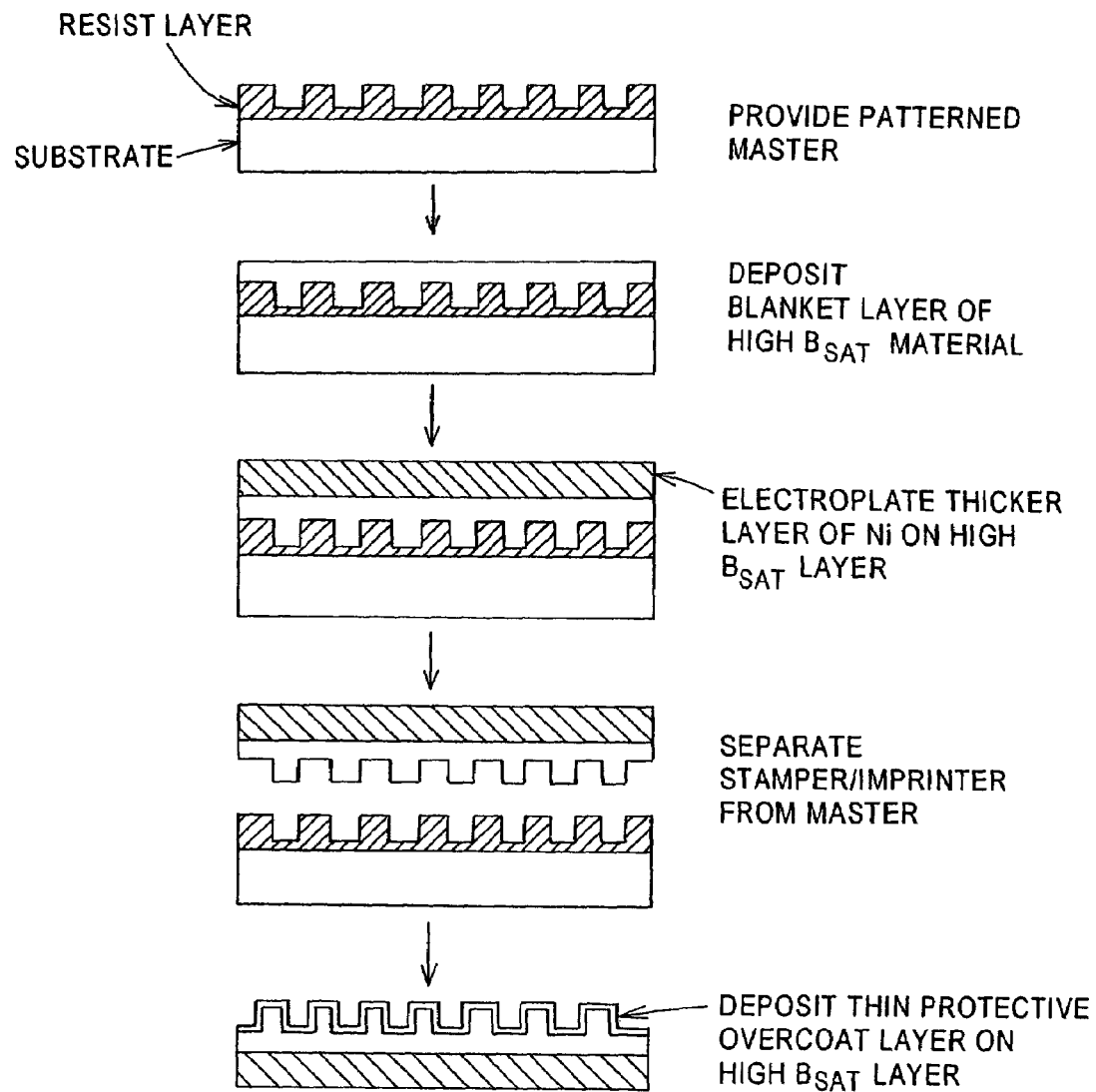
FIG. 6 schematically illustrates, in simplified cross-sectional view, a sequence of steps for forming a high field contrast magnetic stamper/imprinter for recording media patterning, according to another embodiment of the present invention.

Referring to FIGS. 5-6, schematically illustrated therein, in simplified cross-sectional view, are sequences of steps according to alternative embodiments of the present invention for forming a high field contrast magnetic stamper/imprinter for recording media patterning by contact printing.

In an initial step of either embodiment, shown in the uppermost view of each of FIGS. 5-6, a "master" comprised of a substantially rigid substrate with a topographically patterned layer of a resist material thereon is initially provided, the pattern formed in the resist layer by conventional resist exposure/development techniques, and comprising a plurality of projections and depressions corresponding (in positive or negative image form, as necessary) to the desired pattern to be formed in the surface of the stamper/imprinter, e.g., a servo pattern including a plurality of projections (alt. depressions) having a height (alt. depth) in the range from about 100 to about 500 nm, a width in the range from about 50 to about 500 nm, and a spacing in the range from about 50 to about 500 nm.

In the next step according to the invention according to either embodiment, a thin layer of said high $B_{sat} \geq \sim 1.2$ Tesla and high permeability $\mu \geq \sim 5$ material, e.g., selected from the group consisting of NiFe, CoNiFe, CoSiFe, CoFe, CoFeB, and CoFeV, is formed on the topographically patterned surface of the ""master"", as by means of a thin film deposition process selected from the group consisting of electroless plating, physical vapor deposition (PVD) such as sputtering, and chemical vapor deposition (CVD).

According to the embodiment shown in FIG. 5, the thin layer of high $B_{sat}$, high permeability $\mu$ material is electrically conductive and is formed only to a thickness sufficient to facilitate its use as an electrode in a next-performed electrochemical deposition process, e.g., an electroforming process, for forming a relatively thicker blanket layer (i.e., ~1 μm thick) of the high $B_{sat}$, high permeability $\mu$ material overfilling each of the plurality of recesses and including an overburden portion extending over each of the non-recessed areas, the blanket layer having an exposed surface opposite the topographically patterned surface of the master.

According to the embodiment of the invention shown in FIG. 6, deposition of the layer of high $B_{sat}$, high permeability μ material, as by electroless plating, PVD, or CVD, is continued for an interval sufficient to form a relatively thick blanket layer (i.e., >~1 μm thick) of the high $B_{sat}$, high permeability μ material overfilling each of the plurality of recesses and including an overburden portion extending over each of the non-recessed areas, the blanket layer having an exposed surface opposite the topographically patterned surface of the master.

In accordance with the next steps of either embodiment, a relatively thicker Ni layer is then formed on the exposed surface of the blanket layer, as by electroplating, in order to provide the stamper/imprinter with a desired durability/mechanical rigidity and robustness consistent with the requirements of the contact printing process, after which the thus-formed bi-layer or laminated stamper/imprinter structure is separated from the topographically patterned surface of the master to form a magnetic stamper/imprinter comprised of the blanket layer of high $B_{sat}$, high μ material with a topographically patterned surface corresponding to the topographically patterned surface of the master and a thicker Ni backing/support layer overlying the surface of the blanket layer opposite the topographically patterned surface thereof.

According to another aspect of the present invention, applicable to either embodiment and shown in the lowermost view of each of FIGS. 5-6, corrosion/degradation of the Fe-containing imprinting surface of the high $B_{sat}$, high μ layer of the laminated stamper/imprinter is substantially eliminated, or at least minimized, by a step of forming a thin protective overcoat layer, e.g., less than about 100 Å thick, of a corrosion-resistant material on the topographically patterned imprinting surface of the high $B_{sat}$, high μ blanket layer. By way of illustration, but not limitation, suitable protective overcoat layers for use according to the invention may be selected from among carbon materials, e.g., DLC carbon, ion-beam deposited (IBD) carbon, etc., and oxide materials such as alumina ($Al_2O_3$) and silica ($SiO_2$). Suitable deposition techniques for use according to the invention include non-directional sputtering, oblique angle ion beam deposition (IBD), filtered cathodic arc deposition (FCAD), and atomic layer deposition (ALD). Preferably, the stamper/imprinter is rotated during deposition to ensure even surface coverage of the protective overcoat layer.

The present invention thus affords a number of advantages and improvements in magnetic stampers/imprinters for contact printing of magnetic recording media, including servo patterning, which improvements include, inter alia, patterning with high field contrast attributable to use of high $B_{sat}$, high μ materials for the imprinting surface, while retaining the exemplary durability and mechanical characteristics of Ni, as well as improved corrosion protection of the Fe-containing imprinting surface. In addition, the improved magnetic stampers/imprinters according to the invention are readily manufactured by conventional methodologies.

It should be apparent to one of ordinary skill in the art that the present invention provides a significant improvement over the conventional art such as has been described above, particularly with respect to the ease and simplicity of manufacturing high field contrast, high durability stampers/imprinters for use in contact patterning, e.g., servo patterning, of a variety of magnetic and MO recording media. Further, the imprinting surface of the stampers/imprinters according to the invention can be formed with a wide variety of topographical patterns, whereby the inventive methodology can be rapidly, easily, and cost-effectively implemented in the automated manufacture of a number of magnetic articles, devices, etc., requiring patterning, of which servo patterning of longitudinal and perpendicular magnetic recording media merely constitute examples of the versatility and utility of the invention.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A high field contrast magnetic stamper/imprinter for use in patterning of magnetic and magneto-optical (MO) recording media by contact printing, comprising:
   (a) a layer of a magnetic material having a high saturation magnetization $B_{sat} \geq \sim 1.2$ Tesla and high permeability $\mu \geq \sim 5$, said layer including a first, topographically patterned surface and a second surface opposite said first surface, said first, topographically patterned surface comprising a patterned plurality of spaced-apart recesses with a plurality of non-recessed areas therebetween, said topographical pattern corresponding to a magnetic pattern to be formed in said magnetic or MO recording medium; and
   (b) a layer of Ni on said second surface.

2. The stamper/imprinter according to claim 1, wherein:
   said layer of a magnetic material having a high saturation magnetization $B_{sat} \geq \sim 1.2$ Tesla and high permeability $\mu \geq \sim 5$ comprises a high $B_{sat}$ material selected from the group consisting of NiFe, CoNiFe, CoSiFe, CoFe, CoFeB, and CoFeV.

3. The stamper/imprinter according to claim 2, wherein:
   said layer of a magnetic material has a thickness greater than about 1 μm.

4. The stamper/imprinter according to claim 1, further comprising:
   (c) a thin protective overcoat layer of a corrosion-resistant material on said topographically patterned surface of said layer of a magnetic material.

5. The stamper/imprinter according to claim 4, wherein:
   said protective overcoat layer comprises at least one material selected from the group consisting of carbon materials and oxide materials.

6. The stamper/imprinter according to claim 5, wherein:
   said protective overcoat layer is less than about 100 Å thick.

7. The stamper/imprinter according to claim 1, wherein:
said topographically patterned surface of said layer of a magnetic material corresponds to a servo pattern to be formed in a said magnetic or MO recording medium.

8. The stamper/imprinter according to claim 3, wherein:
the Ni layer has a thickness greater than that of said layer of a magnetic material and sufficient for providing said stamper/imprinter with mechanical rigidity and durability consistent with the requirements of the contact printing process.

* * * * *